D. R. LEWIS.
AUTOMOBILE TIRE JACK.
APPLICATION FILED APR. 10, 1915.

1,175,364.

Patented Mar. 14, 1916.

Witnesses
Guy M. Spring
Edward S. Hall.

Inventor
David R. Lewis
By Richard Owen,
Attorney

UNITED STATES PATENT OFFICE.

DAVID R. LEWIS, OF IXONIA, WISCONSIN.

AUTOMOBILE-TIRE JACK.

1,175,364.  Specification of Letters Patent.  Patented Mar. 14, 1916.

Application filed April 10, 1915. Serial No. 20,504.

*To all whom it may concern:*

Be it known that I, DAVID R. LEWIS, citizen of the United States, residing at Ixonia, in the county of Jefferson and State of Wisconsin, have invented certain new and useful Improvements in Automobile-Tire Jacks, of which the following is a specification.

My invention relates to new and useful improvements in lifting jacks and more particularly to jacks used in connection with automobiles.

The jack consists of a central supporting member for the hub of a wheel fulcrumed between two legs, or standards.

The principal object of my invention is to provide a jack for each wheel of a vehicle, each jack placed under the hub of a wheel and when moved into an operative position with wheel raised from the ground, it will be held in said position by the weight of the vehicle. These jacks may be used when it is desired to take the weight of the vehicle off the tires while being repaired or stored away for the winter.

Another object is to provide the legs of a jack with an enlargement intermediate of its ends, and the under face of said legs tapering to a point with respect to its outer longitudinal edge, when in a set up position.

Still another object is to provide a device of this character which is comparatively simple in construction, durable, and inexpensive to manufacture.

With these and other objects in view, my invention consists in the novel features of construction and arrangement of parts hereinafter described and pointed out in the claim.

Figure 1:
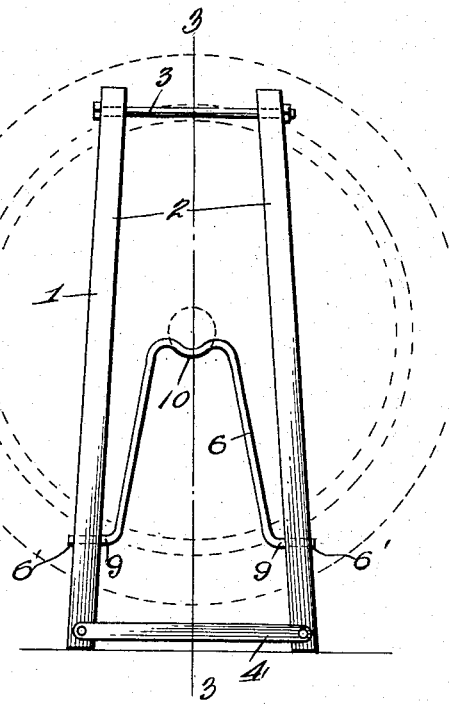
Figure 2:
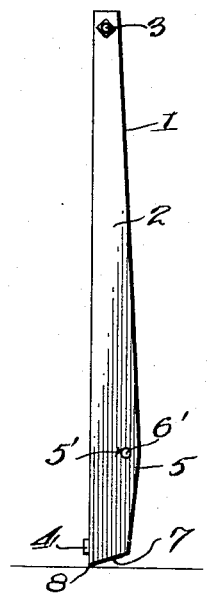
Figure 3:
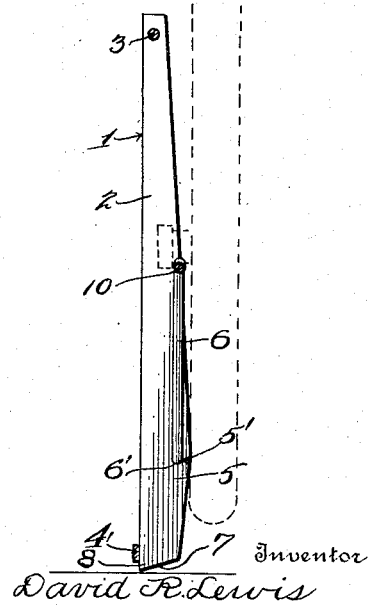

In the accompanying drawings, Figure 1 is a front elevation of a jack in a set up position, showing a wheel in dotted lines, Fig. 2 is a side elevation of the device in a set up position, and Fig. 3 is a longitudinal sectional view of the jack.

In the accompanying drawings, 1 designates a lifting jack, and 2 a pair of standards, or legs, a bolt 3 supporting the upper ends of said legs. The lower end is braced by a plate 4. The legs 2 are enlarged intermediate of their ends, as shown at 5, and the under face 7 cut at a slight angle with respect thereto, to form a pivot 8, and a hub supporting member 6, pivoted off center near the edge of said enlarged portion, as shown at 6'. The hub supporting member 6 is substantially U shaped, and its outer ends bent at an angle, as shown at 9, to be pivoted in the openings 5'. The member 6 is provided at its upper portion with a concavity 10, adapted to receive the hub of a vehicle wheel, as shown in Fig. 1.

In the operation of my invention, the jack is tilted at an angle, with its base adjacent the base of the wheel, suitable to allow the concave portion of the hub supporting member to pass under the hub of the wheel. Then by moving the outer end of the jack up until it is in a vertical position, the wheel is raised from the ground. The U shaped hub supporting member which carries the weight of the vehicle is pivoted off center with respect to the base of the jack, thereby drawing the legs of the jack adjacent the vehicle wheel and holding it in an operative position, without the use of an auxiliary supporting member.

Having thus described my invention, what I claim as new, and desire to secure by Letters Patent, is:—

A device of the character described comprising a pair of spaced legs, a substantially inverted U-shaped supporting member pivotally mounted between the legs, the bottom faces of the legs being flat and arranged at an angle to their longitudinal axes, said flat faces being tapered inwardly relatively to the longitudinal extent of the legs from their outer edges, bearing points being thus provided at the outer edges of the legs.

In testimony whereof I affix my signature in presence of two witnesses.

DAVID R. LEWIS.

Witnesses:
E. C. THEOBOLD,
A. R. LOPPNOW.

Copies of this patent may be obtained for five cents each, by addressing the "Commissioner of Patents, Washington, D. C."